(12) United States Patent
Heller et al.

(10) Patent No.: US 6,820,855 B1
(45) Date of Patent: Nov. 23, 2004

(54) AIR FLOW CONTROL VALVE

(75) Inventors: Patrick Alexander Heller, Cremorne Point (AU); Andrew John McCausland, Clairemont Meadows (AU)

(73) Assignee: Goyen Controls Co. PTY Limited (AU)

( * ) Notice: Subject to any disclaimer, the term of this patent is extended or adjusted under 35 U.S.C. 154(b) by 0 days.

(21) Appl. No.: 09/869,165

(22) PCT Filed: Dec. 22, 1999

(86) PCT No.: PCT/AU99/01145

§ 371 (c)(1),
(2), (4) Date: Sep. 17, 2001

(87) PCT Pub. No.: WO00/39489

PCT Pub. Date: Jul. 6, 2000

(30) Foreign Application Priority Data

Dec. 23, 1998 (AU) .............................................. PP7910
May 10, 1999 (AU) .............................................. PQ0258

(51) Int. Cl.[7] .............................................. F16K 31/12
(52) U.S. Cl. ........................................ 251/29; 137/485
(58) Field of Search .......................... 251/30.01, 30.03, 251/29; 137/485

(56) References Cited

U.S. PATENT DOCUMENTS

| 1,893,254 A | * | 1/1933 | Sweeney | ..................... 137/494 |
| 2,914,086 A | * | 11/1959 | Beller | ......................... 55/309 |
| 3,447,773 A | * | 6/1969 | Huber | ..................... 251/30.03 |
| 3,806,081 A | * | 4/1974 | Otto | ............................. 251/22 |
| 4,175,590 A | * | 11/1979 | Grandclement | ............. 137/883 |
| 5,169,117 A | * | 12/1992 | Huang | ..................... 251/30.03 |
| 5,520,366 A | * | 5/1996 | Elliott | ..................... 251/30.01 |

FOREIGN PATENT DOCUMENTS

| GB | 2 155 593 A | * | 9/1985 | ........... F16K/17/00 |
| JP | 358099580 A | * | 6/1983 | ........... F16K/31/40 |

* cited by examiner

Primary Examiner—Gregory L. Huson
Assistant Examiner—Melvin Cartagena
(74) Attorney, Agent, or Firm—Cowan, Liebowitz & Latman, P.C.

(57) ABSTRACT

An air flow control valve including a valve body having an internal cavity and an inlet and outlet in flow communication with the internal cavity, the axes of the inlet and outlet being aligned at substantially 90° to each other, a valve seat located within the cavity and co-axially aligned with the outlet, the valve seat being located on the distal end of an upstanding tubular pedestal which is formed around the outlet, the internal cavity being configured so as to define an annular space around the pedestal with which the inlet is in flow communication; a flexible generally planar diaphragm mounted above the valve seat, the diaphragm supporting a valve closure member which is adapted to engage the valve seat to close the valve, valve control means for causing the diaphragm to move towards and away from the valve seat to close and open the valve respectiely; and the valve being characterised in that, with the valve oriented with the inlet axis horizontal and the outlet facing downwards, the valve seat is located at an elevation at or below the upper most edge of the inlet, and the diaphragm is located at an elevation above the upper most edge of the inlet.

15 Claims, 12 Drawing Sheets

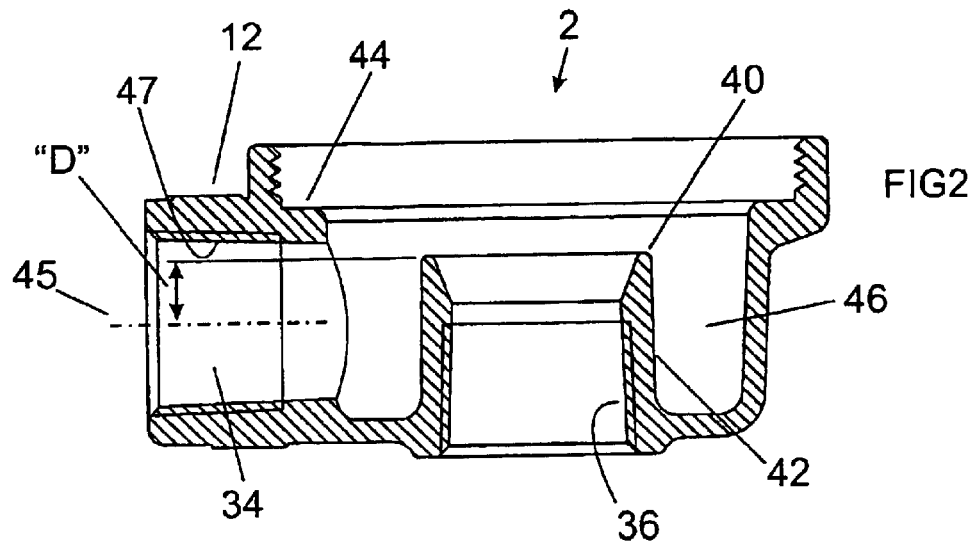
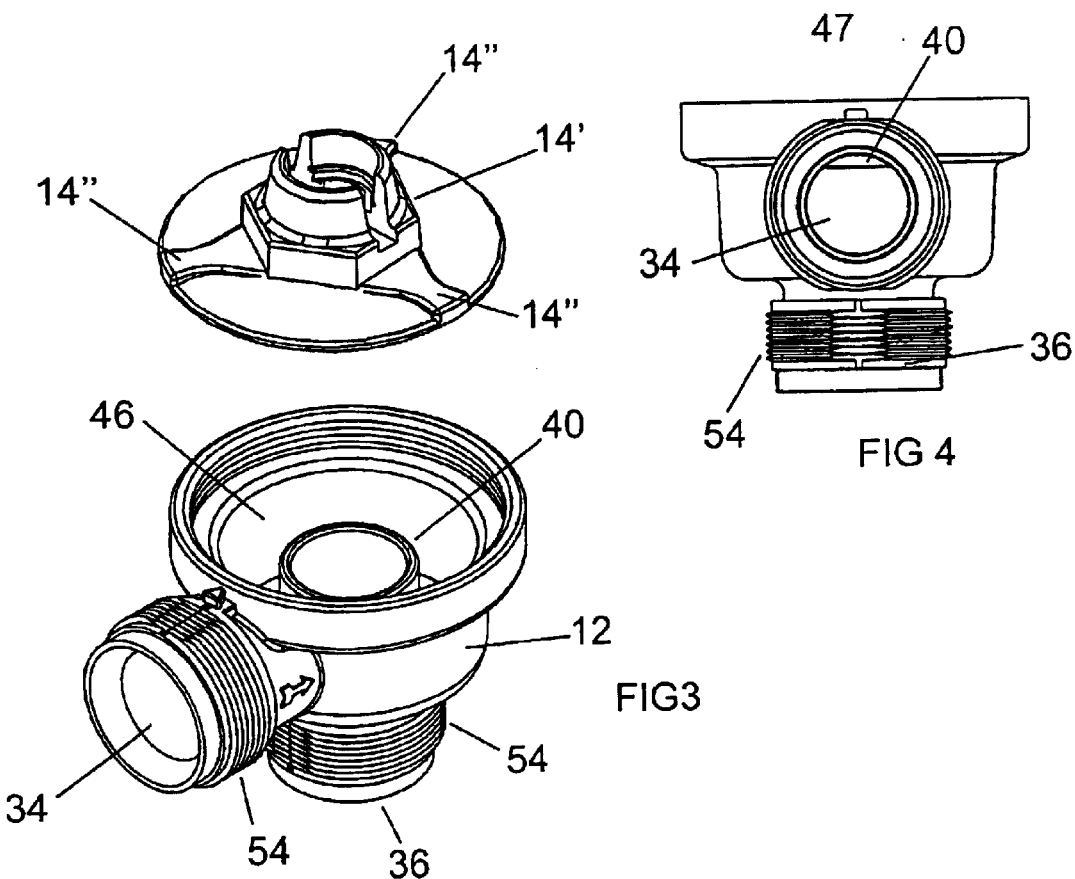

AIR FLOW CONTROL VALVE

FIELD OF THE INVENTION

This invention relates to a diaphragm operated air flow control valve of the type typically used in the dust collector industry. The valve of the invention will be suitable for use in that industry, but it is to be understood that the valve of the invention can be used in other applications as well.

BACKGROUND OF THE INVENTION

Air flow control valves used in the dust collection industry have a series of reasonably specific design constraints which they must meet in order to operate effectively. For example, typically the valves have inlets and outlets arranged at 90° to each other, the valves are typically electronically controlled, and the supply and outlet pipes which lead towards and away from the valve are typically either 20 mm, 25 mm or 45 mm in diameter.

Typically these valves have a valve closure member mounted to a diaphragm and by controlling the pressure on opposite sides of the diaphragm the valve can either be opened or closed. The pressurised air supply provides the necessary pressure for controlling the valve and a bleed arrangement is provided for supplying air under pressure to opposite sides of the diaphragm.

Since these aspects of the valves are well-known, they need not be described in this document in any great detail.

There are important performance characteristics which such valves must meet in order to be competitive in the industry. For example, the valves must open rapidly and there must be a minimum pressure drop across the valve when the valve is open. In addition, the valves should be relatively easy to manufacture, assemble and install, and maintenance of the valves should be possible without removing the valve body from the equipment onto which is has been installed.

SUMMARY OF THE INVENTION

According to one aspect of the invention there is provided an air flow control valve including:

a valve body having an internal cavity and an inlet and outlet in flow communication with the internal cavity, the axes of the inlet and outlet being aligned at substantially 90° to each other;

a valve seat located within the cavity and co-axially aligned with the outlet, the valve seat being located on the distil end of an upstanding tubular pedestal which is formed around the outlet;

the internal cavity being configured so as to define an annular space around the pedestal with which the inlet is in flow communication, flexible generally planar diaphragm mounted above the valve seat, the diaphragm supporting a valve closure member which is adapted to engage the valve seat to close the valve;

valve control means for causing the diaphragm to move towards and away from the valve seat to close and open the valve respectively; and the valve being characterised in that, with the valve oriented with the inlet axis horizontal and the outlet facing downwards, the valve seat is located at an elevation at or below the upper most edge of the inlet, and the diaphragm is located at an elevation above the upper most edge of the inlet.

Preferably the upper most edge of the valve seat is located a distance which is approximately one third the diameter of the inlet above the centre line of the inlet.

Preferably the valve body has a bowl portion in which the inlet and outlet are located, and a cap portion in which the valve control means is located, the cap portion having screw threads thereon adapted to engage with screw threads on the bowl portion, the diaphragm being captively held in position between the cap portion and the bowl portion when the cap portion is operatively screwed onto the bowl portion. The screw threads on the bowl portion are preferably of female configuration, and the threads on the cap portion are preferably of male configuration.

A further feature of the invention provides for the cross sectional area of the annular space or bowl area relative to the area of the valve seat to be in the range of 2.5:1 to 4.5:1, and preferably in the range of 3.2:1 to 3.6:1.

The internal diameter of the valve seat is preferably larger than the internal diameter of the outlet, and the inner wall of the tubular pedestal preferably tapers convergently from the valve seat towards the outlet.

The inlet and outlet can have any suitable connection arrangement for connecting air flow conduits to the valve. In one arrangement the inlet and outlet both have an internally threaded socket adapted to each receive a respective externally threaded tubular conduit.

The diaphragm can have a bleed hole (such as bleed hole 26 of FIGS. 1 and 7A) therethrough adapted to feed pressurised air from the annular space into the area above the diaphragm. Optionally the diaphragm can be spring-loaded into engagement with the valve seat. If desired a combination of a bleed hole and spring bias can be utilised.

The present invention also provides a valve body and cover, said valve body including a threaded portion to engage a mating threaded portion on said cover, said body and said cover having respective engagement members which are adapted to engage each other in use, said members being positioned so that said cover, when threaded onto said body, will rotate a necessary number of turns to secure said cover to said body to a predetermined torque, indicated by said engagement members engaging each other preventing any further tightening, said engagement members not engaging or contacting until said predetermined torque is reached.

Preferably it takes 1½ turns to secure said cover from first engagement of the threads of said cover and body until engagement of the respective engagement members.

The engagement members can be located outside of a circumference of said cover, or alternatively located within a circumference of said cover. Preferably said cover and said body include a releasable securing means so that said cover cannot be unsecured from said body until said releasable securing means has been released.

Preferably said cover body each have an aperture therein so that once said engagement members are engaged, said apertures are aligned so as to receive a locking means. Preferably said locking means is any one of: a pin; a plastic pin; a cable tie or a retractable pin.

Alternatively said body can include a system pressure activated pawl, with said cover having a recess or aperture, whereby when said valve is pressurised the pawl moves into said recess thereby locking the cover and body together until depressurised.

Preferably the threaded portion of one or both of said cover and said body includes at least one groove extending generally laterally relative to the thread direction, said at least one groove permitting the exhaust of gas in said valve body once a seal between said cover and said body is broken.

The engagement members can be protruding bosses, lugs, faces, pins, or any appropriate formation, or combinations of these, which can extend laterally or axially relative to the valve body and or cover.

An operator to open and close a control valve having:

a body member which is separate from said control valve but is connectable thereto, said body member having a first side with connection means for connection to said control valve and a second side to engage a valve member;

said body member including a passage communicating from said first side to said second side to allow gas from said control valve through said body member when connection has been made;

said body member including a seat around said passage on said second side, which is closable by said valve member, to open and close said passage when desired.

Preferably the valve member is movably held between said body member and a second member which connects to said body member.

The body member can be made from a plate having on one side connection means to connect either directly or remotely to said control valve.

Preferably said plate includes support members on said second side extending away therefrom.

The body member can include a peripheral wall around said plate. Alternatively said body member can be generally cup shaped.

The second member can be a solenoid casing which is held by or which holds said body member.

Alternatively the second member can be a tubular member such as a ferrule tube, which is held by or which holds said body member, said tubular member in turn being held by or which holds a solenoid casing.

The second member being held by support members on said body member so as to be kept a predetermined distance away from said seat.

The second member having associated therewith a bias means to bias said valve member towards or away from such seat.

The operator when in use being directly connected to said control valve,

Alternatively the operator when in use is connected to said control valve by means of a tube allowing the operator to be remotely located relative to said control valve.

The body member preferably has a plurality of ports formed between a like number of support members extending away from said body member.

Preferably the valve member is a plunger.

BRIEF DESCRIPTION OF THE DRAWINGS

Further features of the invention will be made apparent from the description of the embodiments thereof given below by way of examples. In the description references are made to the accompanying drawings, but the specific features shown in the drawings should not be construed as limiting on the invention.

Embodiments are described with reference to the following drawings in which.

FIG. 2 illustrates an enlarged cross-sectional side view of the bowl portion of the valve body of FIG. 1;

FIG. 3 illustrates a perspective view of a valve similar to FIGS. 1 and 2 with different connecting portions and with the cover removed from the body portion;

FIG. 4 illustrates an end view of the bowl portion of the body of the valve shown in FIG. 3;

DETAILED DESCRIPTION OF THE EMBODIMENTS

Figure 1:
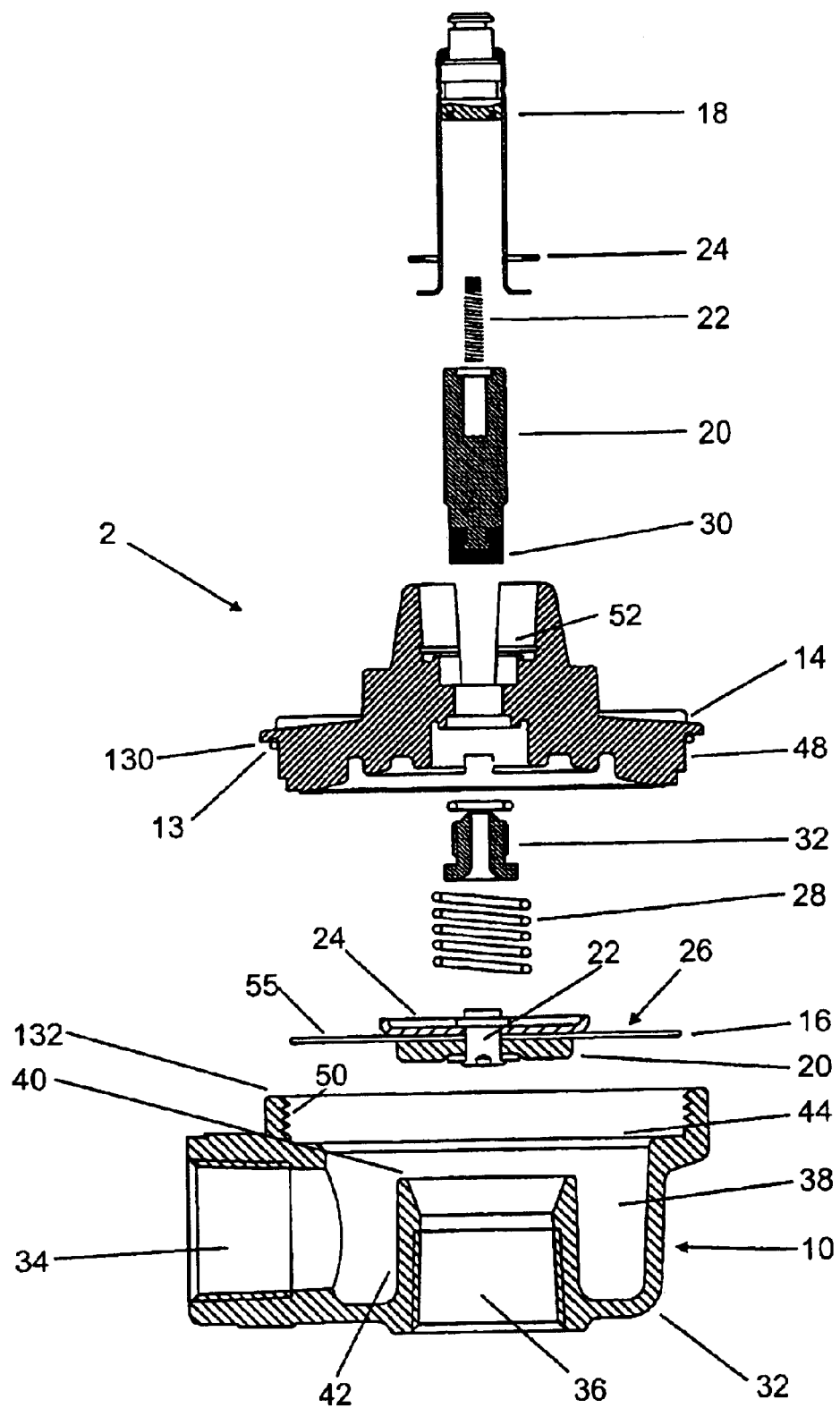
FIG. 1 illustrates an exploded cross-sectional side view of an air flow control valve.

Illustrated in FIG. 1 is a flow control valve 2 which includes a valve body 10 having a bowl portion 12 and a cap 14, which in use is mounted to the bowl portion 12 with an O-ring seal 13 to seal the under side of flange 130 of cap portion 14 with a sealing rim 132 at the top of the bowl portion 12. The cap portion 14 will, in use, hold a diaphragm assembly 16 to the body portion 12. The valve 2 is controlled by a solenoid operated plunger assembly 18 which includes a plunger 20, compression spring 28 and a retaining clip 24. These components are well known in the art and need not to be described herein in any detail.

The bowl portion 12 has an inlet 34 and an outlet 36 both of which are in flow communication with an internal cavity 38. The internal cavity 38 is of a circular or bowl shaped configuration. A valve seat 40, which is coaxial with and surrounds the outlet 36, is formed on the bowl portion 12. The valve seat 40 is located on the upper or distal end of a tubular pedestal 42 which surrounds the outlet 36. The pedestal 42 serves to lift the valve seat 40 adjacent the under side of the diaphragm assembly 16 which will he mounted against an annular seat 44 formed on the body portion.

Turning to FIG. 2 of the drawings, the body portion 12 is shown in more detail. The configuration of the body portion 12 achieves significant efficiencies for the valve.

The inlet 34 of the body portion 12 has a centre line 45 which, when the body portion is oriented, as shown in FIG.

2, with the centre line 45 horizontal and the outlet 36 facing downwardly, the valve seat 40 is located below the upper most edge 47 of the inlet 34. In other words, the valve seat 40 is relatively close to the centre line 45 of the inlet 34. In the arrangement shown in FIG. 2, for example, where the inlet diameter 34 is approximately 24 mm, the dimension "d" is approximately 9 mm which is significantly less than the applicant's prior art valve arrangements which is approximately 20 mm. The dimension between the diaphragm seat 44 and the valve seat 40 has also been increased. In the applicant's prior valve that dimension was approximately 6 mm whereas in the present embodiment that dimension is approximately 9 mm. However, it is believed that it is the lowering of the valve seat 40 in relation to the inlet port centre line which has significantly improved the efficiency of the valve. The effect of these dimensional changes is that when the valve is open, a relatively large opening is achieved between the diaphragm and the valve seat, and the valve seat is also located within the direct flow path of air flowing from the inlet to the outlet. This ensures a significantly lower pressure drop across the valve.

One difference in particular is that the column entitled Bowl Area/Seat Area indicates that for the valves embodying the invention, namely those with a "3" suffix that this ration is in the range of 2.5:1 to 4.5:1 and more particularly in the range of 3.2:1 to 3.6:1.

Figure 7:
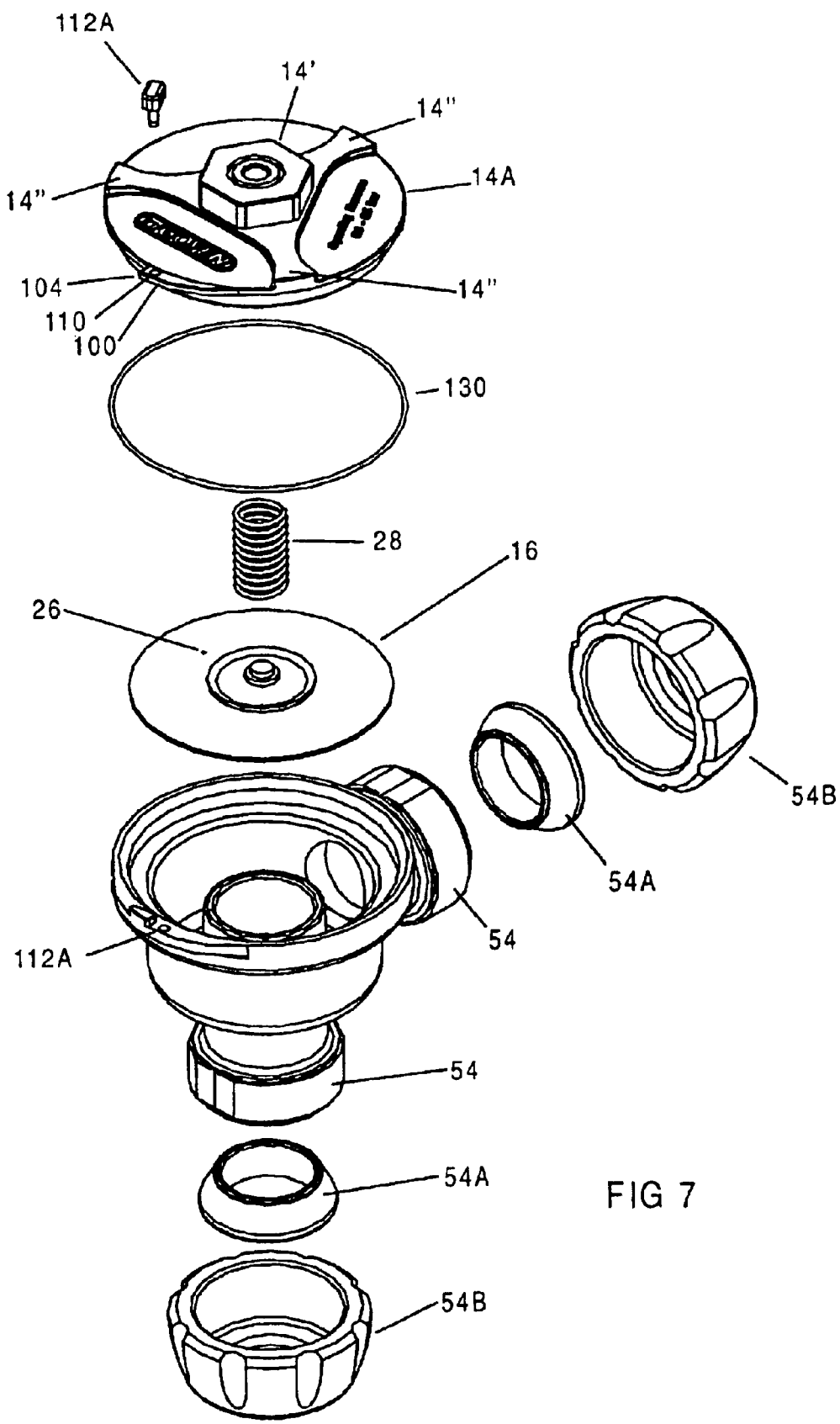
FIG. 7 illustrates an exploded perspective view of valve components to construct a valve similar to that of FIGS. 5 and 6.
Figure 11:
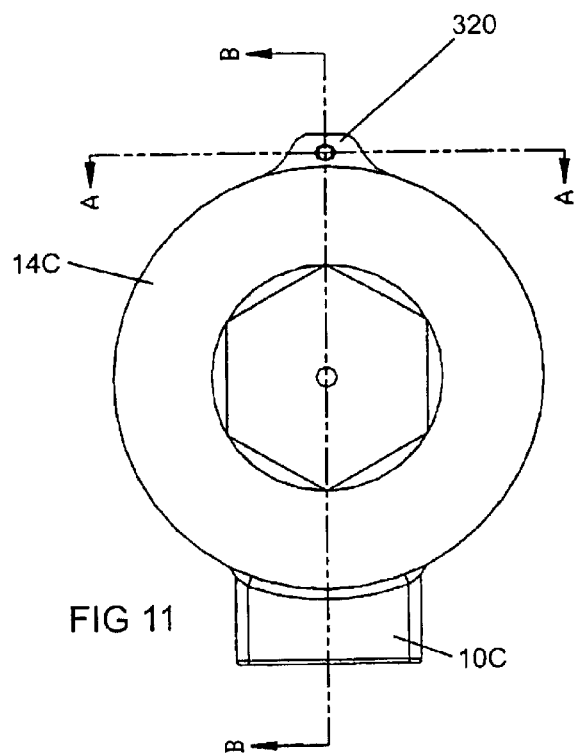
FIG. 11 illustrates a plan view of an arrangement to lock a cover relative to a valve body when pressurised.
Figure 13:
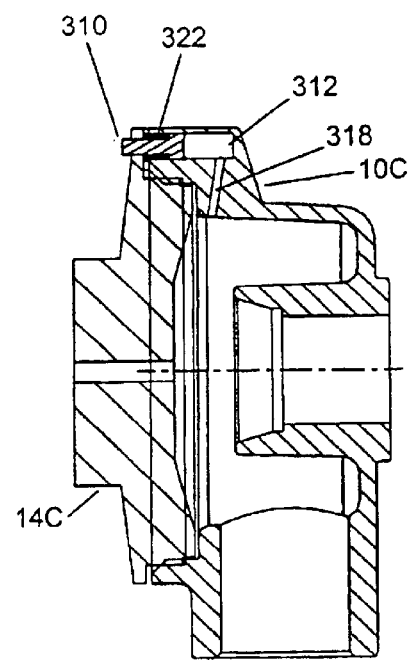
FIG. 13 illustrates a cross section through the valve of FIG. 11 through the plane BB.

The FS, DD and T are letter codes representing for the inlet and outlet configurations available in the industry. The FS valves generally have a structure where the inlet has a tubular connection with a flange surrounding its end, while the outlet has an unthreaded unflanged tubular construction. The DD valve has male threaded inlet and outlet which cooperates with a gland nut and frusto-conical seal as illustrated in FIG. 7. The T valve has an inlet and outlet with female threads as illustrated in FIGS. 1, 2 and 11 through to 14.

TABLE I

| Valve | Seat ID (mm) | Seat OD (mm) | Seat Area (mm2) (Based on ID) | Bowl ID (mm) | Bowl Area (mm2) | Seat Area/ Bowl Area | Bowl area/ Seat Area | Inlet Cr-line to Seat Ht (mm) | Inlet port dia (mm) | % port dia. exposed |
|---|---|---|---|---|---|---|---|---|---|---|
| 25FS-3 | 35.00 | 42.00 | 962.11 | 77.00 | 3271.18 | 0.29 | 3.40 | 14.30 | 39.40 | 13.71 |
| 25FS std | 31.50 | 42.00 | 779.31 | 64.00 | 1831.55 | 0.43 | 2.35 | 30.80 | 39.40 | −28.17 |
| 20FS-3 | 27.50 | 32.50 | 593.96 | 60.00 | 1997.85 | 0.30 | 3.36 | 9.00 | 26.00 | 15.38 |
| 20FS std | 23.00 | 27.40 | 415.48 | 51.30 | 1477.28 | 0.28 | 3.56 | 19.50 | 25.20 | −27.38 |
| 200D-3 | 27.50 | 32.50 | 593.96 | 60.00 | 1997.85 | 0.30 | 3.35 | 9.00 | 256.0 | 14.00 |
| 20T-3 | 27.50 | 32.50 | 593.96 | 60.00 | 1997.85 | 0.30 | 3.36 | 9.00 | 23.90 | 12.34 |
| 20T,DD-std | 20.50 | 25.80 | 330.06 | 50.80 | 1504.04 | 0.22 | 4.56 | 15.20 | 23.00 | −16.09 |
| 45FS-3 | 55.00 | 63.50 | 2375.83 | 120.00 | 8142.80 | 0.29 | 3.43 | 15.00 | 46.00 | 20.00 |
| 45FS std | 53.50 | 63.50 | 2248.00 | 95.50 | 3996.10 | 0.56 | 1.78 | 37.90 | 46.00 | −5.80 |
| 45T,DD std | 50.80 | 59.00 | 2026.83 | 95.50 | 4429.05 | 0.46 | 2.19 | 37.80 | 40.40 | −10.65 |

Notes for Table 1
Seat Area Based on ID column Seat area is based on ID.
Bowl Area Column Bowl area is based on (bowl ID minus seat OD).
Inlet Centreline to seat height column Height from inlet port centreline to diaphragm flange.
Inlet port diameter column Only 25FS-3 dimension quoted against 25FS/T/DD-3 row.
% port dia exposed column Based on % of port diameter (not area) exposed above body seat.

In addition to lowering the valve seat the applicant has also increased the diameter of the annular space 46 around the pedestal 42. This has been achieved by an increase in the diameter of the body portion 12. This larger bowl area allows for a straighter flow path of high pressure air across the valve seat 40 and into the outlet 36 when the valve is open. Furthermore, this arrangement provides a higher static pressure recovery (due to lower air velocity around the bowl) inside the bowl. The higher the static pressure inside the bowl, the better the flow across the seat when the valve is open.

These new configurations in the valve body have helped to achieve an approximately 40% flow improvement (Kv) against applicant's own prior art valve of similar external dimensions. The attached Table 1 sets out a comparison of a valve of the present embodiment (being those marked with a suffix "3" in column 1) and certain of the applicant's comparable prior art valves (being those with a suffix "std" in column 1).

Clearly, the applicant does not in any way wish to be bound to any of the dimensions or ratios listed in Table 1 but those dimensions indicate certain of the differences between the prior art valves and the valve of the present embodiment which have gone towards achieving this improvement in flow performance.

Other improvements of the valve are that the cap portion 14 has a male threads 48 which engage in female threads 50 formed in the body portion. This allows the cap portion 14 to be screwed onto and off the body portion for quick assembly and maintenance. The plunger assembly, likewise, is simply fitted to the cap portion by the clip 24 which engages in a groove 52. The cap 14 includes a hexagonal formation 14' to allow a spanner to engage it and also provides gripping formation 14" so that tightening by hand can be performed.

It will be appreciated that the valve seat 40 could be lowered even closer to the centre line 45 of the inlet. This could be achieved by, for example, increasing in the thickness of the valve closure 20, thereby bringing the contact face of the valve closure member 20 closer to the valve seat 40. Also, the increased bowl diameter has the effect of increasing the diameter of the diaphragm 55 allowing more movement of the diaphragm 55 and therefore permitting the valve seat 40 to be located a greater distance away from the valve closure member 20 than is the case with small diameter diaphragms.

It will be appreciated that maintenance of the valve can take place in a relatively simple fashion. To maintain the valve after it has been installed onto equipment the cap portion 14 is simply screwed off the body portion 12 allowing the diaphragm assembly 16 to be removed and replaced as necessary. The plunger assembly 18 can, similarly, be removed from the cap portion by releasing the clip 24. This is a simple operation and allows for far quicker maintenance and inspection than is the case where a series of bolts or screws are used to hold down the cap and the plunger assembly.

It will be appreciated that the simplicity of the valve also enables the valve to be easily and rapidly assembled during manufacture. In addition, the simplicity of the design has significantly reduced the number of parts of the valve and this has therefore reduced the cost of the valve.

Illustrated in FIGS. 3 and 4 is a valve body similar to that of FIG. 2, except that there are male threaded connections 54 to allow connection to the inlet 34 and outlet 36. It will be noted that the valve of FIG. 2 has two female connections. Other valves connections could be provided such as flanges clamped or bolted fitting arrangements.

Figure 5:
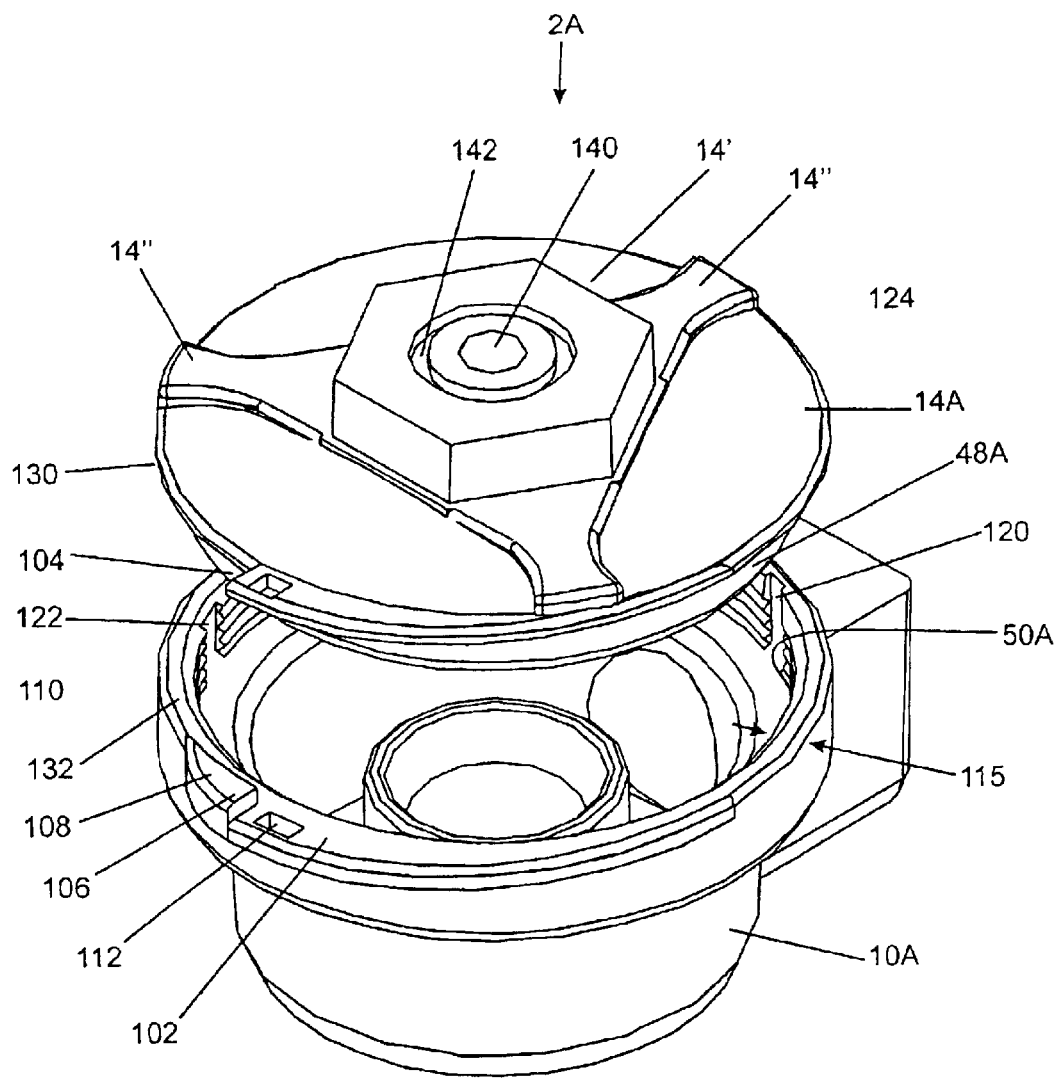
FIG. 5 illustrates an exploded view of another valve body and cover.

Illustrated in FIG. 5 is an exploded view of a valve 2A having a cover 14A and body 10A similar to valve 2, cover 14 and body 10 of FIG. 1. Many of the components illustrated in previous Figures are not illustrated in FIGS. 5 and 6 to provide better clarity. The cover 14A has a male thread 48A whilst the body 10A has a female thread 50A which mates with the male thread 48A.

The cover 14A and body 10A differ from the cover 14 and body 10 of FIG. 1 by the presence of a radially extending portion 100 on the cover 14A and a similar shaped radial extension 102 on the body 10A. The extension 100 terminates in a face 104 which can engage protruding boss 106 on body 10A. The height of the extension 100 and the pitch of threads 48A and 50A are designed and arranged so that the cover 14A will be tightened onto the body 10A after 1½ turns of the cover 14A. Thus to connect the cover 14A to the body 10A the thread 48A has to begin on cover 14A in the vicinity of the face 104 whereas the thread 50A needs to begin at a location diametrically opposite to protruding boss 106. In this way after the first half turn with the threads engaged, the lower most portion of face 104 will pass close to, but not make contact with, the upper surface 108 of protruding boss 106. The protruding boss 106 is of a depth or height equal to the pitch of the thread 50A or 48A. Thus after one further complete turn the underneath surface of extension 100 and face 104 will be at the same level as the upper surface of extension 102 and the face 104 will be prevented from moving further in a tightening direction by means of the protruding boss 106.

In this way, the cover 14A can not be overtightened onto the body 10A. The bosses 104 and 106 being highly visible allows a service person or fitter of these valves to know if the valve cover 14A has been appropriately tightened.

Figure 6:
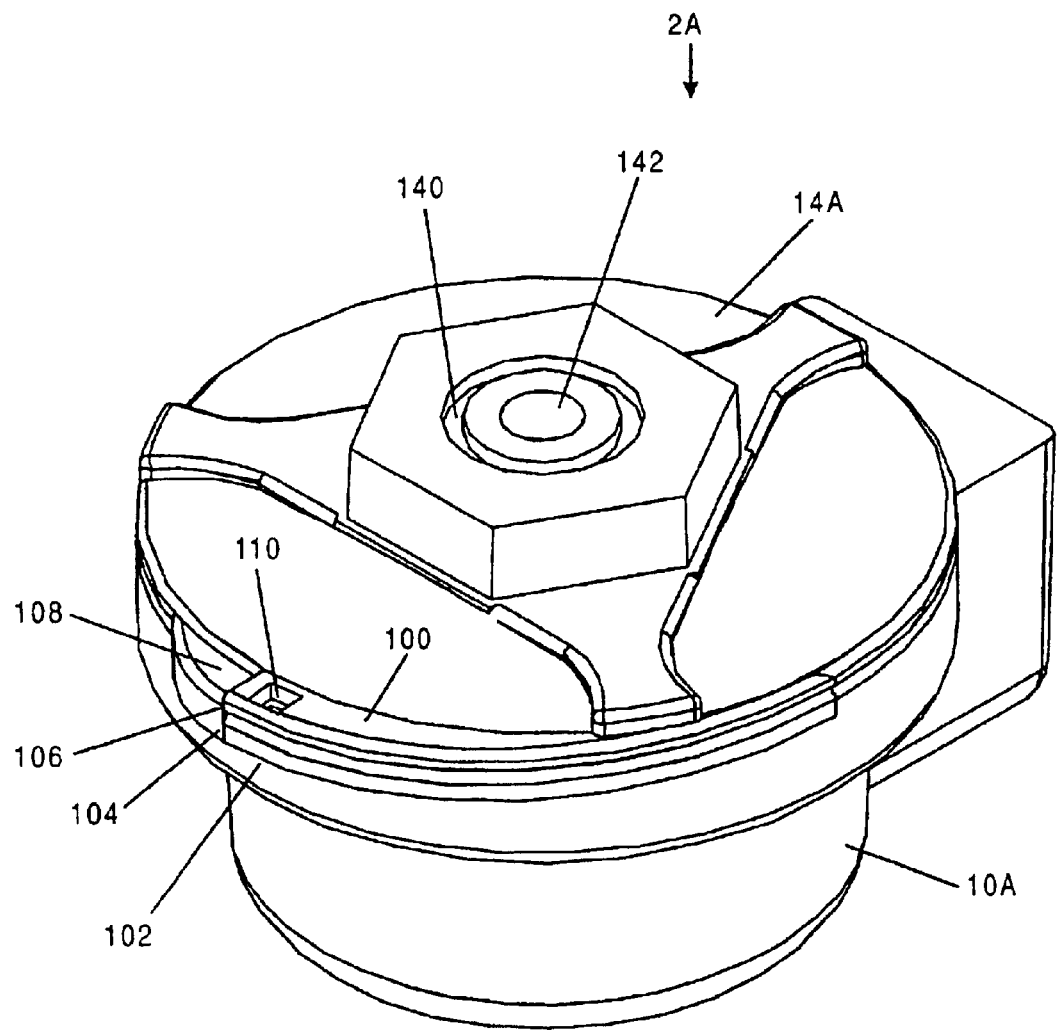
FIG. 6 illustrates the cover and body of FIG. 5 in an assembly.

If desired, as illustrated in FIGS. 5 and 6, an aperture 110 can be provided through the extension 100 in the vicinity of face 104 and an aperture 112 can be provided in the extension 102 in the vicinity of protruding boss 106, so that once the face 104 and boss 106 are contacting (as in FIG. 6) the apertures 110 and 112 are in alignment. This allows a pin, or a cable tie or other locking apparatus to be threaded through apertures 110 and 112 and secured to prevent the cover 14A from unwinding from the valve body 10A unintentionally. To an extent it also ensures that the valve has not been tampered with since the last servicing. The latter especially is possible if the locking means is of the sort that needs to be destroyed to be removed such as a cable tie or a frangible pin.

In the embodiment of FIGS. 5 and 6 the face 104 and boss 106 are provided in an offset location compared to the circumference of the cover 14A. If desired similar bosses can be provided within the circumference of the body 10A, however to do this may require the wall thickness 115 (see FIG. 5) to be increased in order to allow sufficient bearing area of face 104 and boss 106 and to allow for some locking mechanism if desired.

It can be seen in FIG. 5 that the threads 50A and 48A have axially extending grooves 120 and 122 on the body 10A and grooves 124 on the cover 14A. The grooves 120, 122 and 124 ensure that once the cover 14A is unscrewed relative to the body 10A and the underneath flange 130 of the cover 14A breaks contact with an O-ring seal (not illustrated) situated on top of rim 132, any gas pressure inside the valve body 10A will be exhausted through the grooves 120, 122 and 124. Clearly, the grooves need only be formed on any one of the valve body 10A or cover 14A, however, if desired, they can be located on both as is illustrated in FIG. 5. It is will be readily understood that this feature of one or more grooves 120, 122 or 124 is a desirable safety feature, and need not be present for the working of the valve.

Figure 7A:
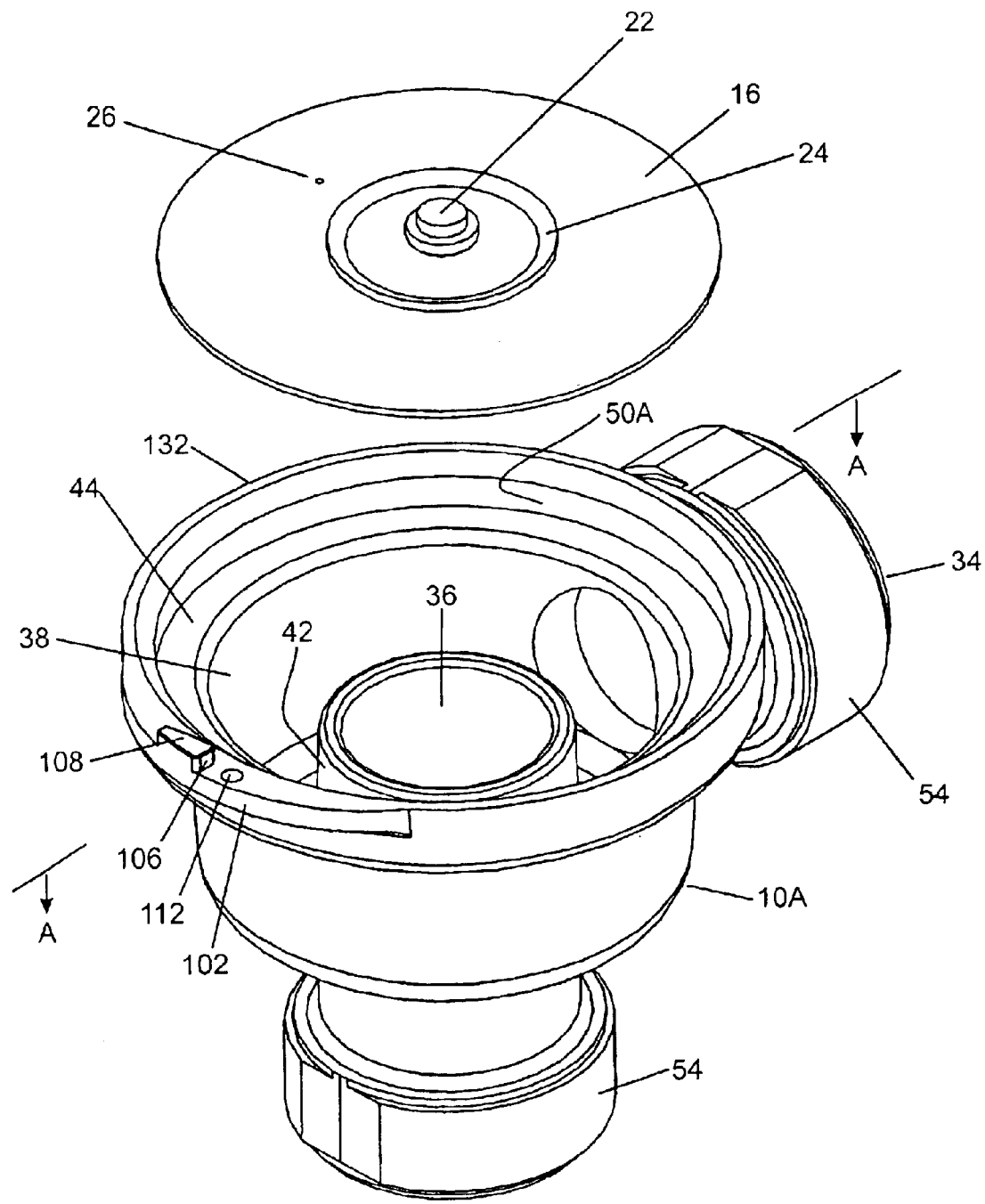
FIG. 7A illustrates a perspective view of the valve body and diaphragm of FIG. 7.

Illustrated in FIGS. 7 and 7A is a valve construction similar to that of FIGS. 3 and 4, with a cover arrangement similar to FIGS. 5 and 6. In FIG. 7 like parts to those of previous Figures have been like numbered, and their function and purpose need not be described further. As can be seen from FIG. 7 the flow control valve 2B has a valve cover 14A, O-ring seal 130, spring 28 and diaphragm 16. The body 10A has inlet and outlet threaded connections 54 which cooperate with frusto-conical seals 54A and gland nuts 54B which together form a sealed connection with a conduit passing through them once gland nut 54B is secured to threads 54 thus compressing the seals 54A to seal against outer surface of the conduit.

Illustrated in FIG. 7 is a pin 112A which is sized to fit through circular apertures 110 and 112 in the cover and body respectively when the cover 14A is screwed onto the body 10A and the apertures 110 and 112 are aligned.

This alignment is assured due the arrangement of the threads 50A and 48A, and the cooperative interaction 21, of boss 106 and shoulder 104 which engage each other preventing further tightening of the cover 14A on body 10A as described in relation to FIGS. 5 and 6.

Figure 8:
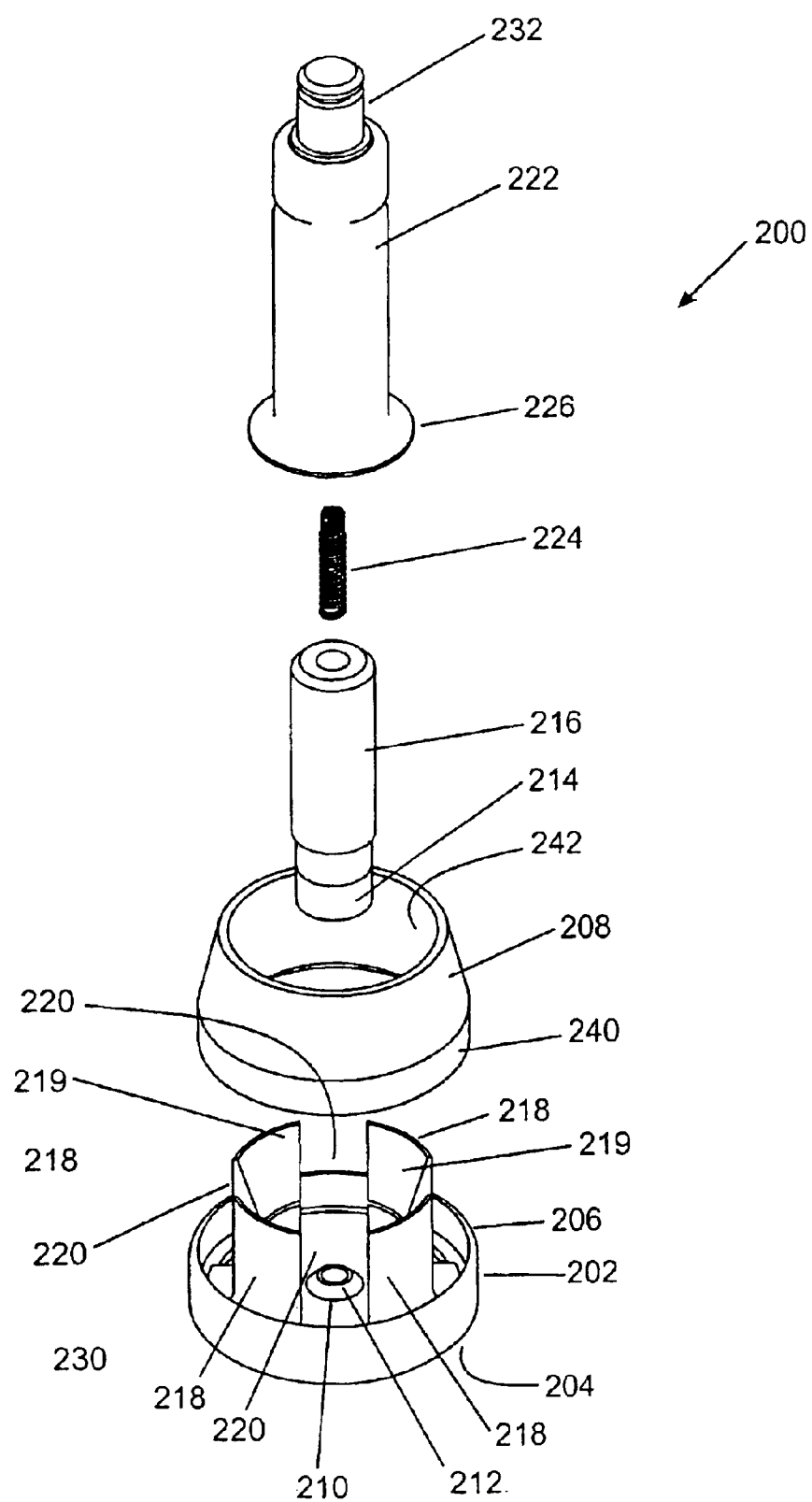
FIG. 8 illustrates an exploded view of an operator or pilot valve for use with the cover of FIGS. 5, or 6.

As illustrated in FIG. 7A the valve body 10A includes an extension 100 similar in purpose to the extension 100 of FIG. 5. except that the extension 100 of FIG. 7A is of a shape which allows the valve body 10A to have an axis of symmetry on either side of a plane AA which passes through the inlet, the outlet and bowl portion. The boss 106 also has a shape allowing it to be readily die cast. The boss 106 is sized relative to the threads 48A and 50A and the face 104 so as to function in the same manner as boss 106 of FIGS. 5 and 6. Turning now to FIG. 8 there is disclosed a valve operator 200 for use with the covers of FIGS. 5 and 6.

The operator 200 has a base 202 which can be made from a plastics material or alternatively manufactured from any suitable material such as steel, brass, aluminium, etc. If a plastics material is desired, preferably nylon 6 or glass filled nylon is utilised. However, if the operator 200 is to be used in a high temperature environment, the base 202 may need to be made of a material of better heat resistance than plastics and thus a metal or other heat resistant material will be more appropriate.

The base 202 has a generally planar undersurface 204 to provide a sealing surface in conjunction with an o-ring (not illustrated) which would be positioned inside a groove 140 as illustrated in FIG. 5, 6 or 7.

When used with the embodiment illustrated in FIGS. 5 to 7 the connecting means between the base 202 and the cover 14A or 14B is by means of a threaded tubular portion (not illustrated in FIG. 8 but see similar feature being item 410 in FIGS. 9 and 10) which extends downwardly from base 202 and engages the threaded port 142 in covers 14A of FIGS. 5 and 6. This is a preferred arrangement and other mechanisms could be used to connect the base 202 to the port 142 in a sealed arrangement. Such other mechanisms can include bayonet fittings; providing the base 202 with a female thread to engage a male threaded portion surrounding the port 142; or other appropriate arrangement can be used.

The base 202 as illustrated in FIG. 8 includes an upwardly extending circumferential skirt 206 which serves the purpose of surrounding the base of a silencer 208 when located on the base 202. Skirt 206 is optional and is provided in this embodiment mainly for aesthetic reasons. If desired, the base 202 can be made from a simple plate construction (that is without skirt 206) having an upper and lower generally planar surface (see base 202 A in FIGS. 9 and 10).

In the centre of the base 202 in FIG. 8 is a valve seat 210 having a generally conical shape and providing a port 212 which can be sealed by means of a valve member 214 at the base of a plunger 216.

Upwardly extending from the base 202 are four support walls 218 which have spaces 220 between respective support members 218. The spaces 220, when the operator 200 is assembled, effectively form exhaust ports so that any air passing through the valve seat 210 when the valve member 214 is not engaging the valve seat 210, will pass through the port 212 and out to atmosphere via the spaces 220.

The valve stem 216 is concentrically held over the valve seat 210 by means of a ferrule tube 222. The ferrule tube 222 is assembled to the base 202 by first inserting the compression spring 224 and the plunger 216 coaxially adjacent thereto. The ferrule tube 222 is then pushed into connection with the base 202, so that the rim of the base 226 of ferrule tube 224 when pushed towards base 202, engages the angular surfaces 219 of each member 218, thereby pushing the members 218 radially outward from the central axis of the base 202. The members 218 continue to move outward until the base 226 of the ferrule tube 222 is located within a groove 230 which holds the base 226 and prevents it from moving either towards or away from the base 202.

Once the base 226 of the ferrule tube 222 is located in line with the groove 230 on each member 218, the members 218, by their relatively elastic nature, move radially inward relative to the central axis of the base 202, thus locking ferrule tube 222 in position. The groove 230 and support members 218 keep the base 222 from moving relative to the seat 210 in any direction, ensuring that the ferrule tube 222 will apply an appropriate spring tension by means of spring 224 to force the plunger 216 to the closed position against the expected pressure which can be applied by gas pressure within the valve body, which bears against valve member 214 via port 212.

The operator 200 has its valve seat 210 normally closed due to the compression of spring 224. A solenoid or coil (not illustrated) when activated, will pull the plunger 216 away from seat 210 against the bias of spring 224. The ferrule tube 222 is received in the solenoid, which is secured to the ferrule tube 222 by means of a circlip (not illustrated) around the groove 232 in the iron top and shading ring 232A.

The silencer 208 is a ring of porous plastic or could be of some other porous material such as sintered bronze which would be particularly useful in high temperature environments. The silencer 208 is an optional feature of the operator 200 as the silencer 208 is not required for the operation of the operator 200. However, with current noise abatement regulations and occupational health standards, the silencer 208 can be applied to the operator 200 by simply concentrically locating the silencer 208 around the outside surfaces of each of the support members 218 and locating the lower portion 240 of silencer 208 inside the annular space located between the outwardly facing side of support members 218 and the inwardly facing surface of annular skirt 206.

If desired, the lower portion 240 of silencer 208 can have a male thread formed thereon, with a female thread being formed on the inwardly facing surface of skirt 206. If such threads were provided in portion 240, then the silencer 208 could be screwed into the base 202 by means of threads on annular skirt 206 and lower portion 240. This will permit the silencer 208 to have a tapered inner surface 242 so that as the silencer 208 is screwed into the base 202, the surface 242, if tapered, will force the support members 218 towards the central axis of the base 202. This will positively urge the support members 218 towards the centre of the base thus securing the ferrule tube 222 into the annular groove 230. Even without such threading and tapering, the silencer 208 helps to prevent the support members 218 from moving in a radially outwardly direction thus preventing them from disengaging from the base 226 on ferrule tube 222.

Figures 9, 10:
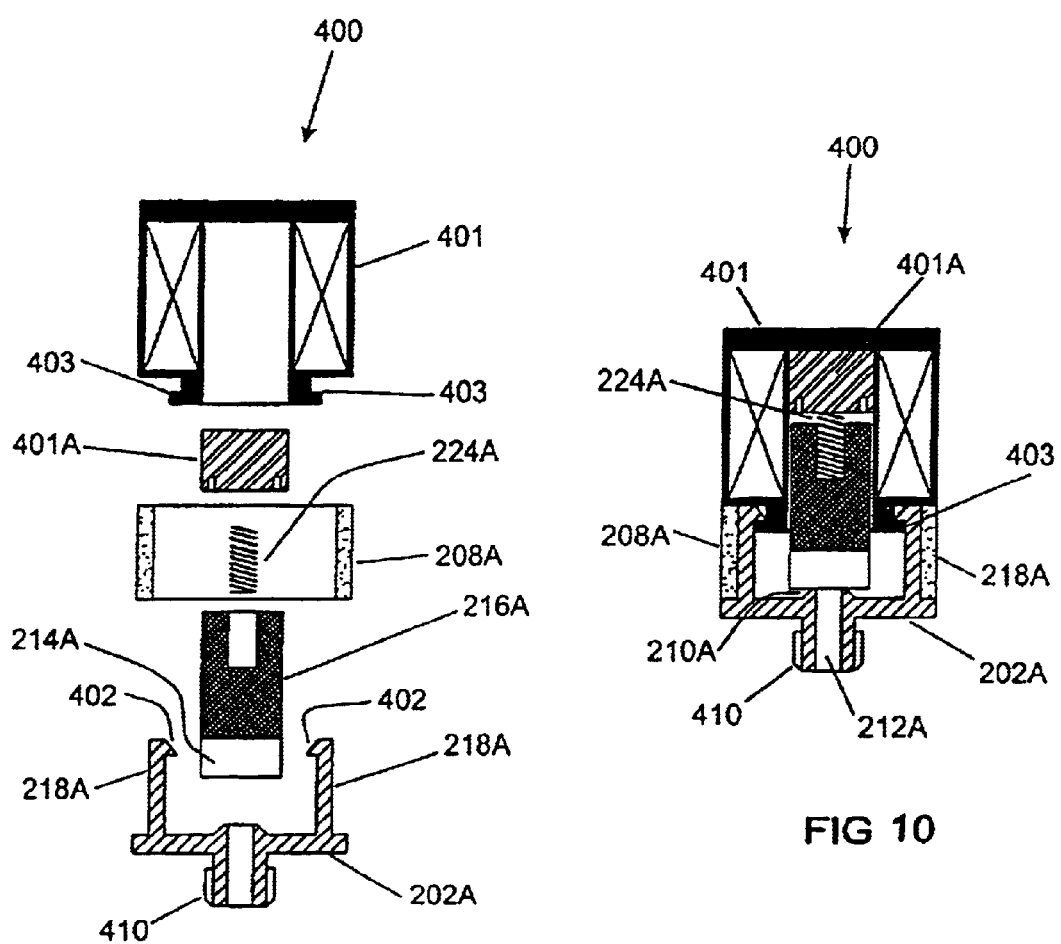
FIG. 9 illustrates a cross section of the exploded parts of another operator construction.
FIG. 10 illustrates a cross section of the operator of FIG. 9 in assembled condition.

In another embodiment, an operator 400 is illustrated in FIGS. 9 and 10. Like parts of the embodiment of FIGS. 9 and 10 compared to FIG. 8, have been like numbered and their function need not be repeated, as reference can be had to the previous description. In this embodiment the operator 400 is formed with a base 202A which interconnects, without means of a ferrule tube, to a solenoid body 401. That is the base 202A and the solenoid body 401 alone provide the means to slidably retain the plunger 216A in position and permit it only to move in an axial direction towards and away from the valve seat 210A. In this embodiment an iron top and shading ring 401A is provided within the solenoid body 401.

Four support members 218A terminate in a barb formation 402 so as to engage flange 403 formed with or attached to the casing of solenoid body 401. The operator 400 of FIGS. 9 and 10 has like parts to the valve 200 of FIG. 8. These like parts are like numbered and end with the letter "A".

In FIGS. 9 and 10, there can be seen the threaded tubular spigot 410 (not illustrated in FIG. 8) which allows for threaded attachment to the threaded port 142 of FIGS. 5 to 7.

Illustrated in FIGS. 15 to 18 is another operator 400A similar to that illustrated in FIGS. 9 and 10. Like parts in FIGS. 15 to 18 when compared to FIGS. 8 to 10 have been like numbered, and further description of their function is not required as reference can be had to the previous description.

The operator 400A includes a solenoid body 401 which has four equi-spaced retaining formations 403A which extend radially away from a cylindrical portion 403B at the base of the solenoid body 401. Each retaining formation 403A includes a groove 403C and an tapered lower extremity, the purpose of each these be described later.

The support walls 218A are similar to those in FIGS. 9 and 10, except that a barb like structure 402A is outwardly directed and the four equi-spaced support walls 218A are of a width to fit into the spaces between the retaining formations 403A.

Figure 16:
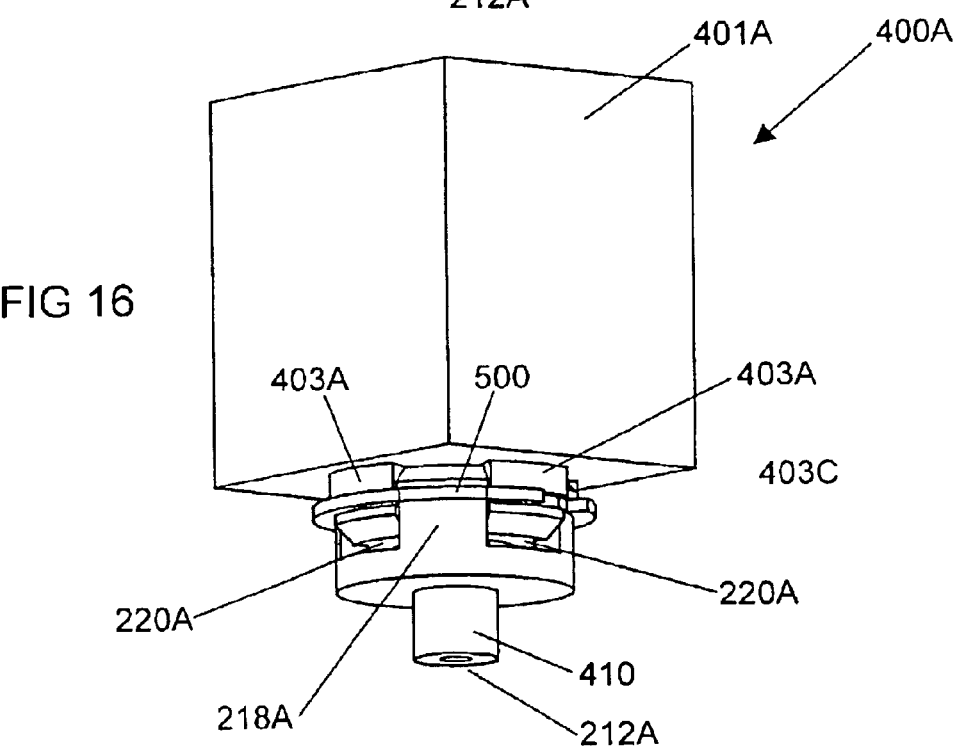
FIG. 16 shows the pilot valve or operator assembled from the parts of FIG. 15.

A retaining ring 500, such as circlip, cable tie, twisted wire or other appropriate retainer can be used to retain all the components securely together as illustrated in FIG. 16. As can be seen in FIG. 16, when assembled, the support walls 218A fit between the retaining formations 403A until the lowermost part of the barb 402A is at the upper most wall or part of the groove 403C. Once in this position the circlip 500 can be positioned in the groove 403C thus keeping all the components locked together. The tapered lower extremity of the retaining formations 403A aid in the positioning of the circlip 500, by allowing the circlip 500 to be expanded due to it being pushed along the tapered extremity in the divergent direction. Once circlip 500 is aligned with groove 403C, the circlip will enter the groove 403C and trap the barb 402C into the position illustrated in FIG. 16.

Figure 17:
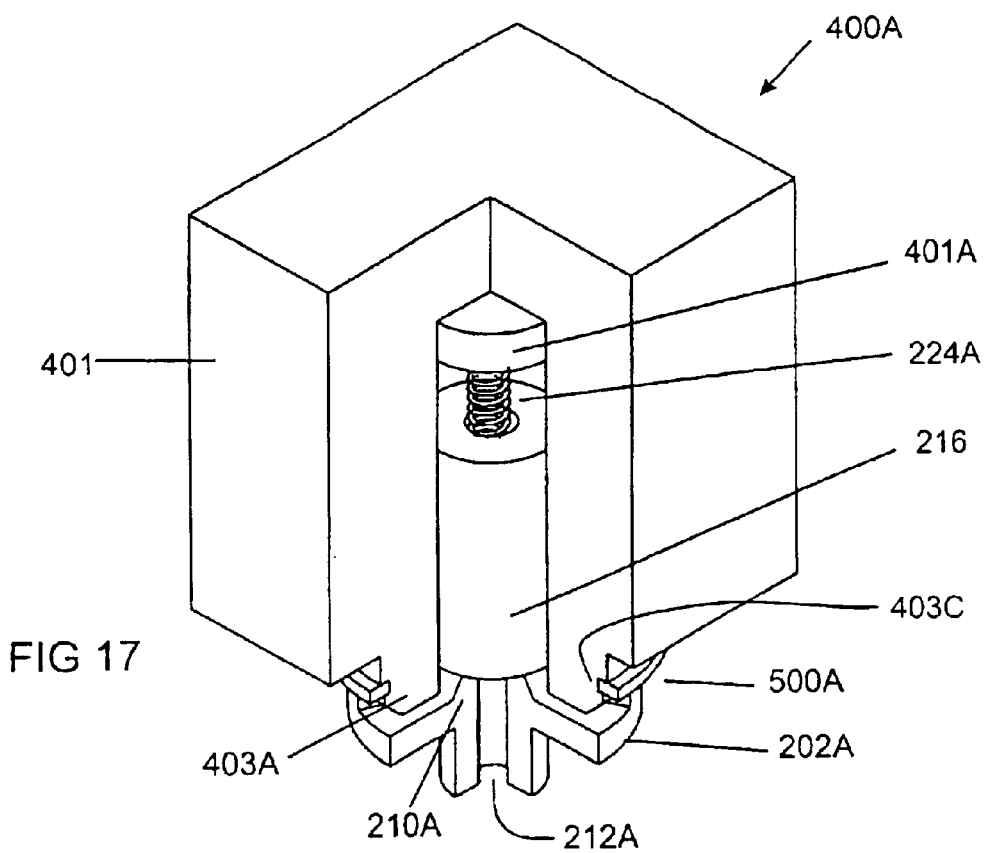
FIG. 17 illustrates a part cross section through the pilot valve or operator of FIG. 16, with the pilot valve or operator in the closed condition.
Figure 18:
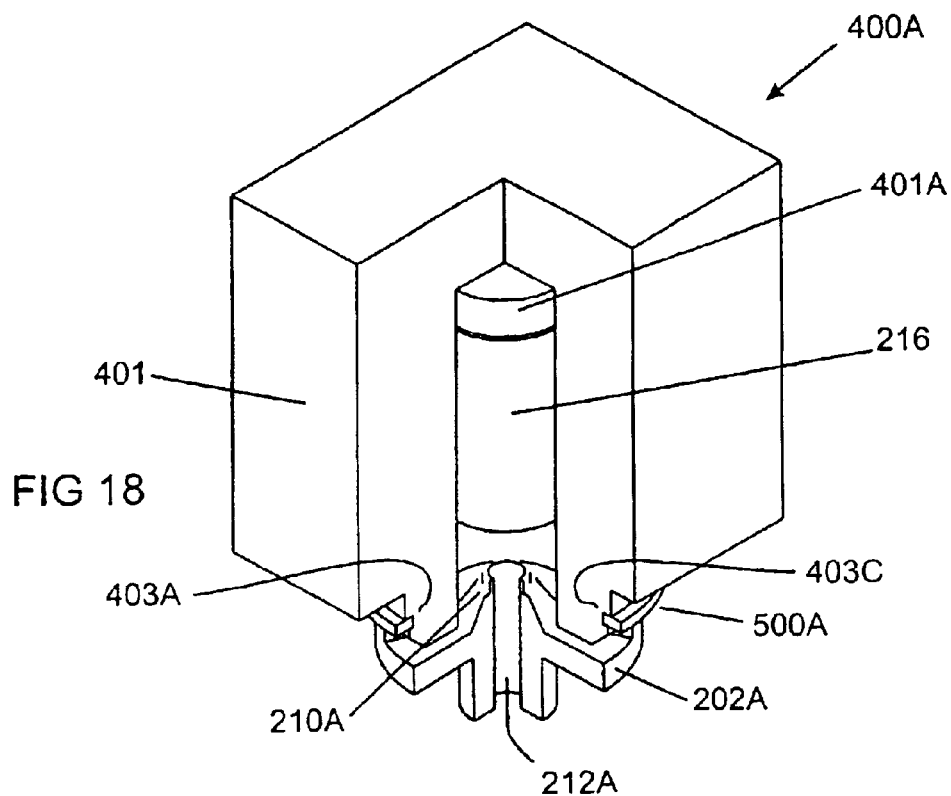
FIG. 18 illustrates a part cross section through the pilot valve or operator of FIG. 16, with the pilot valve or operator in an open condition.

As can be seen in FIGS. 17 and 18 when the operator 400A is closed the spring 224A biases the plunger 216A to the closed position sealing the valve seat 210A and port 212A. When the solenoid in solenoid body 401 is activated as in FIG. 18, the plunger 216A is retracted compressing the spring 224A between the plunger 216A and iron top and shading ring 401A, thereby opening the port 212A to atmosphere. This allows air to escape through spaces 220A (see FIG. 16) between the support walls 218A and underneath the retaining formations 403A, thereby forcing the diaphragm to move the valve seat in the valve body to the open position.

Figure 14:
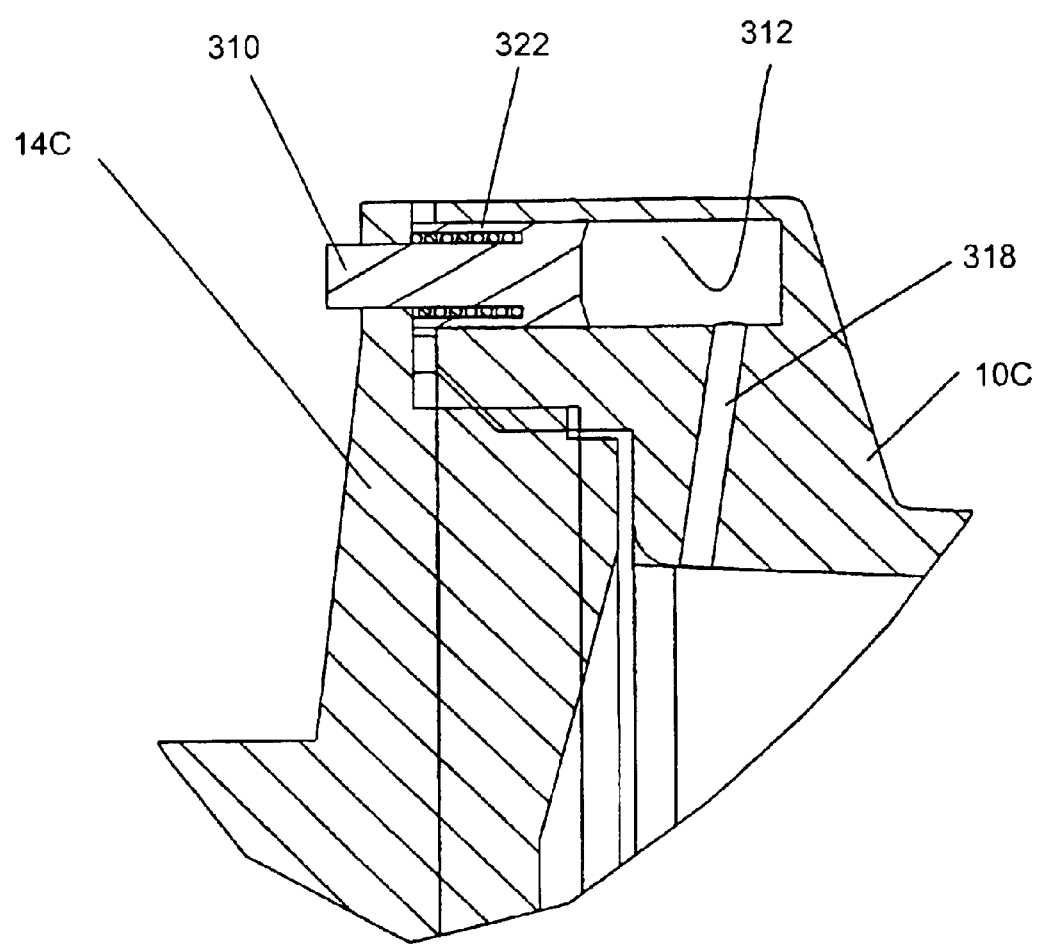
FIG. 14 illustrates a detail of the right hand side of the cross section of FIG. 13.
Figure 15:
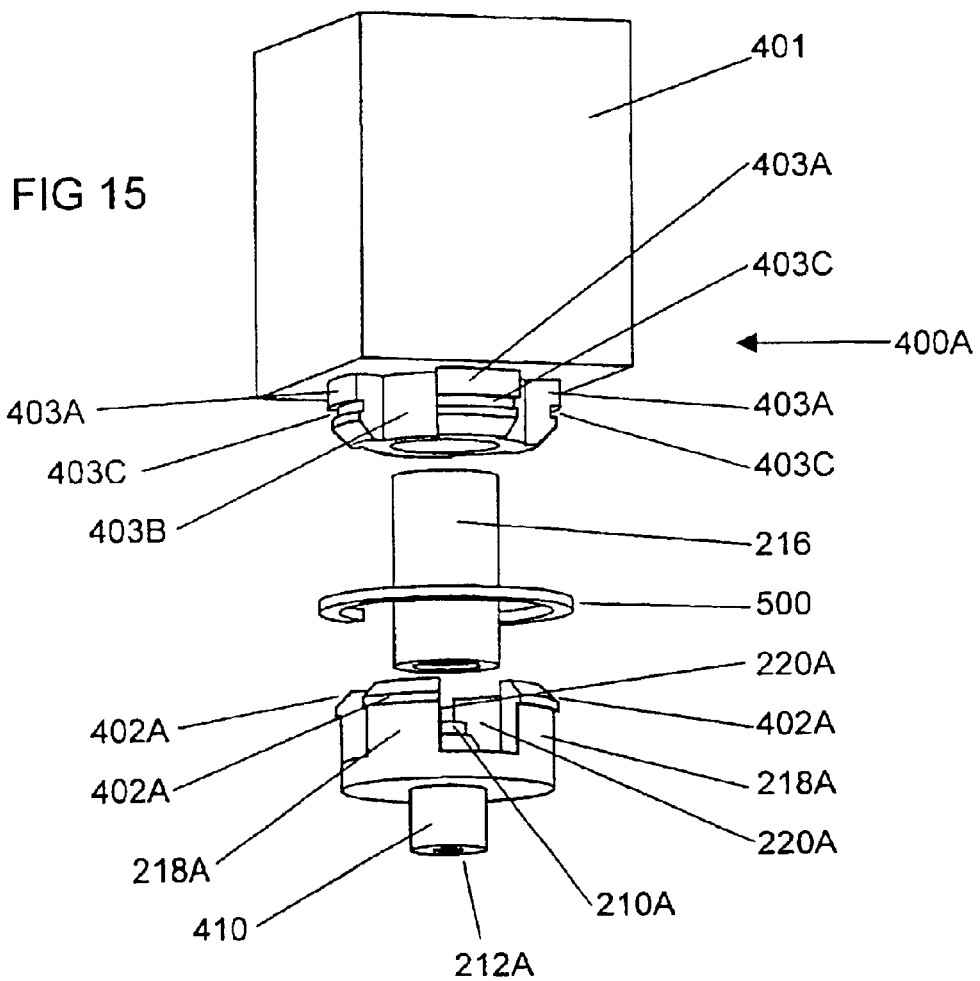
FIG. 15 illustrates an exploded view of a pilot valve or operator assembly similar to that of FIGS. 9 and 10.

Illustrated in FIGS. 11 through to 14 is an alternative mechanism to lock the cover 14C on to a valve body 10C when the valve body 10C is under pressure. The arrangement can be seen more clearly in FIG. 14 whereby a spring biased pawl 310 is situated in a cylinder 312 located in the valve body 10C. As can be seen from FIG. 10, the cylinder 312 is located offset from the circumference of the cover 14C.

Figure 12:
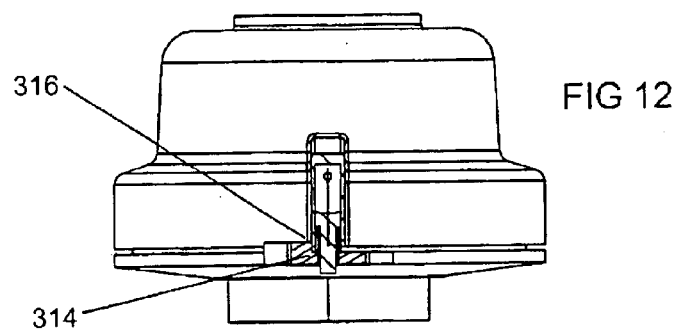
FIG. 12 illustrates a right side elevation of the valve of FIG. 11.

As is illustrated in FIG. 12, the cover 14C operates in a similar fashion to that of FIGS. 5 to 7 in that a protruding boss is provided on the cover 14C which engages a protruding boss or protrusion 316 on body 10C.

The cylinder 312 is connected by a passage 318 to the main volume of the valve body 10C. The cover 14C will be correctly positioned onto the valve body 10C, once the cover 14C is correctly tightened, that is when protruding boss 314 engages protrusion 316. When boss 314 and protrusion 316 engage, this will cause an alignment of aperture 320 over pawl 310. When the aperture 320 is directly above the pawl 310 and pressure is applied to the valve body 10C, air travelling through passage 318 gains access to the cylinder 312 thereby forcing the pawl 310 against the bias of compression spring 322 through the aperture 320 in cover 14C. Thus the 14C cannot be released until such time as pressure is released from the valve body 10C. Once pressure is released, the compression spring 322 will force the pawl 310 back into cylinder 312, thus allowing the cover 14C to be removed from the body 10C.

Clearly, many variations may be made to the above described embodiments without departing from the scope of the invention. The embodiment shown in FIGS. 3 and 4 depicts an arrangement in which the inlet and outlet have external threads 54 thereon to allow for a different type of connection arrangement to the air conduits. However, the arrangement shown in FIGS. 3 and 4 employ the same valve seat configuration which, it will be noted from FIG. 4, is located below the upper edge 46 of the inlet.

It will be understood that the invention disclosed and defined herein extends to all alternative combinations of two or more of the individual features mentioned or evident from the text or drawings. All of these different combinations constitute various alternative aspects of the invention.

What is claimed is:

1. An air flow control valve including:
   a valve body having an internal cavity and an inlet and outlet in flow communication with the internal cavity, the axes of the inlet and outlet being aligned at substantially 90° to each other;
   a valve seat located within the cavity and co-axially aligned with the outlet, the valve seat being located on the distal end of an upstanding tubular pedestal which is formed around the outlet;
   the internal cavity being configured so as to define an annular space around the pedestal with which the inlet is in flow communication;
   a flexible generally planar diaphragm mounted above the valve seat, the diaphragm supporting a valve closure member which is adapted to engage the valve seat to close the valve;
   valve control means for causing the diaphragm to move towards and away from the valve seat to close and open the valve respectively; and
   the valve being characterized in that, with the valve oriented with the inlet axis horizontal and the outlet facing downwards, the valve seat is located at an elevation at or below the upper most edge of the inlet, and the diaphragm is located at an elevation above the upper most edge of the inlet.

2. An air flow control valve as claimed in claim 1 wherein an uppermost edge of the valve seat is located a distance which is approximately one third the diameter of said inlet above a centre line of said inlet.

3. An air flow control valve as claimed in claim 1, wherein said valve body has a bowl portion in which said inlet and said outlet are located, and a cap portion in which said valve control means is located, said cap portion having screw threads thereon adapted to engage with screw threads on said bowl portion.

4. An air flow control valve as claimed in claim 3 wherein said diaphragm is captivity held in position between said cap portion and said bowl portion when said cap portion is operatively screwed onto the bowl portion.

5. An air flow control valve as claimed in claim 3, wherein screw threads on said bowl portion are of female configuration, and threads on said cap portion are of male configuration.

6. An air flow control valve as claimed in claim 1, wherein said valve seat's internal diameter is larger than said outlet's internal diameter.

7. An air flow control valve as claimed in claim 1, wherein said tubular pedestal's inner wall tapers convergently from said valve seat towards said outlet.

8. An air flow control valve as claimed in claim 1, wherein said inlet and said outlet have a suitable connection arrangement for connecting air flow conduits to said valve.

9. An air flow control valve as claimed in claim 8, wherein said inlet and said outlet both have one of the following: an internally threaded socket adapted to each receive a respective externally threaded conduit; and externally threaded tubular member to receive a respective internally threaded conduit; or an attached flange adapted to be attached to a flange on a conduit.

10. An air flow control valve as claimed in claim 1, wherein said diaphragm has a bleed hole therethrough adapted to feed pressurized air from said annular space into a volume above said diaphragm.

11. An air flow control valve as claimed in claim 1, wherein said diaphragm is spring-loaded into engagement with said valve seat.

12. An air flow valve as claimed in claim 1, wherein the elevation of the valve seat is located below the uppermost edge of a portion of the inlet located immediately adjacent to the internal cavity.

13. An air flow valve as claimed in claim 12, wherein the diaphragm is located above said portion of the inlet located immediately adjacent to the internal cavity.

14. An air flow control valve including:
- a valve body having an internal cavity and an inlet and outlet in flow communication with the internal cavity, the axes of the inlet and outlet being aligned at substantially 90° to each other;
- a valve seat located within the cavity and co-axially aligned with the outlet, the valve seat being located on the it distal end of an upstanding tubular pedestal which is formed around the outlet;
- the internal cavity being configured so as to define an annular space around the pedestal with which the inlet is in flow communication;
- a flexible generally planar diaphragm mounted above the valve seat, the diaphragm supporting a valve closure member which is adapted to engage the valve seat to close the valve;
- valve control means for causing the diaphragm to move towards and away from the valve seat to close and open the valve respectively; and
- the valve being characterized in that, with the valve oriented with the inlet axis horizontal and the outlet facing downwards, the valve seat is located at an elevation at or below the upper most edge of the inlet, and the diaphragm is located at an elevation above the upper most edge of the inlet;
- the valve body having a bowl portion in which said inlet and said outlet are located, and a cap portion in which said valve control means is located, said cap portion having screw threads thereon adapted to engage with screw threads on said bowl portion;
- the cross sectional area of said bowl portion's annular space relative to said valve seat's area being in the range of 2.5:1 to 4.5:1.

15. An air flow control valve including:
- a valve body having an internal cavity and an inlet and outlet in flow communication with the internal cavity, the axes of the inlet and outlet being aligned at substantially 90° to each other;
- a valve seat located within the cavity and co-axially aligned with the outlet, the valve seat being located on the distil distal end of an upstanding tubular pedestal which is formed around the outlet;
- the internal cavity being configured so as to define an annular space around the pedestal with which the inlet is in flow communication;
- a flexible generally planar diaphragm mounted above the valve seat, the diaphragm supporting a valve closure member which is adapted to engage the valve seat to close the valve;
- valve control means for causing the diaphragm to move towards and away from the valve seat to close and open the valve respectively; and
- the valve being characterized in that, with the valve oriented with the inlet axis horizontal and the outlet facing downwards, the valve seat is located at an elevation at or below the upper most edge of the inlet, and the diaphragm is located at an elevation above the upper most edge of the inlet;
- the valve body having a bowl portion in which said inlet and said outlet are located, and a cap portion in which said valve control means is located, said cap portion having screw threads thereon adapted to engage with screw threads on said bowl portion;
- the cross sectional area of said bowl portion's annular space relative to said valve seat's area is being in the range of 3.2:1 to 3.6:1.

* * * * *